United States Patent [19]
Mayer

[11] 3,980,439
[45] Sept. 14, 1976

[54] FLUIDIZING APPARATUS WITH FORAMINOUS MEMBER

[75] Inventor: Albert Louis Mayer, Wilmington, Del.

[73] Assignee: E. I. Du Pont de Nemours and Company, Wilmington, Del.

[22] Filed: May 14, 1975

[21] Appl. No.: 577,282

[52] U.S. Cl. .................................. 23/284; 23/288 S; 34/57 A; 239/567; 432/58; 201/31
[51] Int. Cl.² ...................... B01J 8/18; F26B 17/10; F27B 15/00
[58] Field of Search ............... 23/284, 288 S; 34/10, 34/57 A; 239/567, 553.3; 432/58; 201/31

[56] References Cited
UNITED STATES PATENTS

| | | |
|---|---|---|
| 2,715,018 | 8/1955 | Lapple et al. .................... 23/288 S X |
| 2,944,009 | 7/1960 | Huntley et al. ................. 23/288 S X |
| 2,990,260 | 6/1961 | Mungen ............................ 23/288 S |
| 3,100,693 | 8/1963 | Klem et al. ...................... 23/288 S X |
| 3,190,730 | 6/1965 | Korwin et al. .................... 23/284 X |
| 3,266,788 | 8/1966 | Jukkola ............................. 34/10 X |
| 3,660,476 | 5/1972 | Ichikawa et al. ................... 23/284 X |
| 3,765,101 | 10/1973 | Avery ................................ 34/57 A |
| 3,829,983 | 8/1974 | White ............................ 23/288 S X |

*Primary Examiner*—Norman Yudkoff
*Assistant Examiner*—Barry I. Hollander

[57] ABSTRACT

An improved material fluidizing apparatus having a series of communicating reaction chambers separated by a concavo-concave foraminous member having a plurality of spaced frusto-conical openings through which a mixture of gases and solids can flow. This apparatus is useful for sustaining fluidization in a recirculating flooded dense bed, particularly under conditions of high temperature.

2 Claims, 3 Drawing Figures

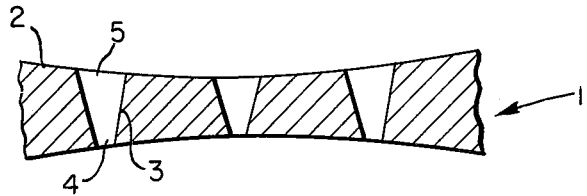
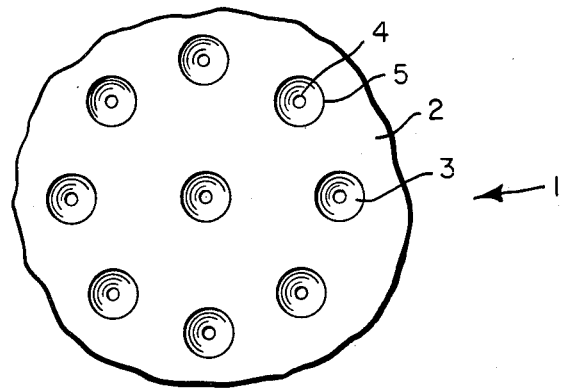
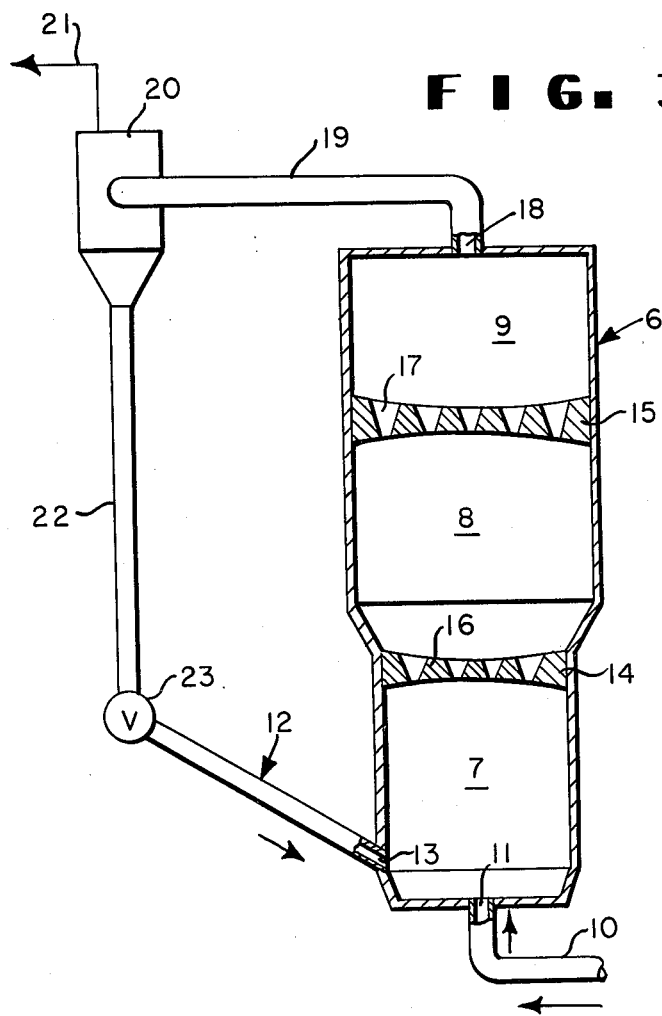

FLUIDIZING APPARATUS WITH FORAMINOUS MEMBER

BACKGROUND OF THE INVENTION

A wide variety of fluidizing apparatus are used in the art to facilitate mixing of a gaseous and solid medium. The apparatus range in complexity from a single chamber reactor, such as that described in Sawyer U.S. Pat. No. 2,642,339, to multi-chamber reactors, such as those described in Avery U.S. Pat. No. 3,765,101 and Reeves et at. U.S. Pat. No. 3,793,444. In multi-chamber reactors, each chamber is usually separated from the next by a foraminous member, commonly known as a distributor plate or baffle, to prevent excessive channeling and bubbling of gas through the fluidized bed and to increase the length of the reaction zone beyond that which could be achieved without the use of such foraminous members. Various design concepts relative to the use of foraminous members for fluidized beds are known in the literature, e.g., A.I.Ch.E. Jour., Vol. 5, No. 1, March 1959, pp. 54–60.

Many multi-chamber fluidizing aparatus described in the art employ distributor plates or baffles having conically shaped holes through which gas is passed to promote fluidization of solid particles contained in or fed to a reaction chamber above the plate or baffle. In such apparatus it is usually considered undesirable for any significant amount of solid particles to drop through the plate or baffle or build up on the surface thereof. As a consequence, the apparatus is often operated at high superficial gas velocities, e.g., 15 to 30 ft./sec., and the plate or baffle is commonly designed to have a pattern of sharp edges to minimize flat areas on the surface of the plate or baffle which is exposed to settling solid particles. When lower superficial gas velocities are employed, the plate or baffle is often equipped with a gaspermeable cap or plug to prevent backflow of solids.

For solids catalyzed reaction where high surface area is important, the use of high superficial gas velocities in fluidizing apparatus is economically unattractive because the resulting fluidized beds are so dilute that the amount of material reacted per unit of reactor volume is relatively small. In fluidizing apparatus employing lower superficial velocities, e.g., Sawyer U.S. Pat. No. 2,642,339, the fluidized bed is quite dense and it is not practical for the bed depth to exceed a certain maximum level without encountering excessive channeling and bubbling of gas through the bed. That maximum size is, moreover, well below the minimum size that is considered to be commercially attractive.

To overcome the low reaction efficiency of dilutephase high superficial velocity fluidizing systems and the size limitations of dense-phase fluidizing systems, the fluidization method described in Reeves et al. U.S. Pat. No. 3,793,444 employs a reaction vessel containing a plurality of reaction chambers, each separated by a foraminous member, through which the flow of gases and solid particles is recirculated to produce a flooded dense fluidized mass with pneumatic transport of solids throughout the reaction vessel. The pressure drop between successive reaction chambers is maintained in the range of 0.5 to 10 psig. In operation the low pressure drop across the foraminous member, which is flooded on both surfaces by a dense fluidized mass, can cause some of the openings in the foraminous member to plug resulting in less efficient operation. In addition, when the flooded dense bed is fluidized at high temperature, the combination of heat and fluid forces which is exerted on conventionally designed foraminous members can cause considerable warping in metal members and excessive cracking in ceramic members.

The invention provides for a foraminous member, especially designed for use in flooded multi-chamber fluidizing apparatus, which sustains the fluidization of a cocurrent continuous flow of gases and solids therethrough without plugging or cracking.

SUMMARY OF THE INVENTION

This invention provides for an improved material fluidizing apparatus comprising at least two communicating reaction chambers, each reaction chamber being separated from the next adjacent one by a foraminous member, and means for maintaining a recirculating cocurrent flow of gases and solid particles through said reaction chambers. The improvement resides in a special design of the foraminous member. The foraminous member is a concavo-concave structure having a plurality of frusto-conical openings extending therethrough to permit continuous passage of said flow of gases and solid particles from a first reaction chamber to a second adjacent reaction chamber and to produce a pressure drop across said foraminous member from 0.5 to 5.0 psi, said frusto-conical openings being disposed in said concavo-concave structure so as to provide a pattern of spaced substantially circular cavities on the inlet side and the outlet side of said concavo-concave structure, the diameter of said cavities on the inlet side of said concavo-concave structure being from 25 to 100 times greater than the average particle size of said solid particles, the diameter of said cavities on the outlet side of said concavo-concave structure being from 2 to 10 times greater than the diameter of said cavities on the inlet side of said concavo-concave structure, and the percentage of the area of the outlet side of said concavo-concave structure defining said frusto-conical openings being at least 70% of the total area of said outlet side of said concavo-concave structure.

DETAILED DESCRIPTION OF THE INVENTION

The invention will be more clearly understood from the following description wherein reference is made to the accompanying drawings. The drawings showing the invention are schematic and not necessarily to scale.

FIG. 1 is a cross-sectional view of an embodiment of the foraminous member of the invention.

FIG. 2 is a top-view of an embodiment of the foraminous member shown in FIG. 1.

FIG. 3 is a cross-sectional view of a multichambered fluidizing apparatus of the invention.

Referring to FIG. 1, the numeral 1, indicates generally the foraminous member of the invention. It comprises a solid concavo-concave structure 2 having frusto-conical openings 3 extending therethrough. The openings 3 each have an inlet cavity 4 and an outlet cavity 5. FIG. 2 is a top-view of an embodiment of the foraminous member of FIG. 1 wherein the frusto-conical openings are concentrically disposed in the concavo-concave structure 2.

To insure that the foraminous member of the invention will withstand high temperatures, e.g., 400°C. to 1000°C., and the strong fluid forces associated with flooded dense fluidized beds, the area of the outlet side of the foraminous member which defines the outlet cavities should be at least 70% of the total area of the outlet side of the foraminous member. The diameter of the inlet cavity 4 should be from 25 to 100 times greater than the average particle size of the solid particles to be fluidized to promote smooth passage of particles through the inlet. The diameter of the outlet cavity 5 should be from 2 to 10 times greater than the diameter of the inlet cavity 4 to provide a pressure drop of 0.5 to 5.0 psi across the frusto-conical opening 3.

So long as the above requirements are fulfilled the frusto-conical openings can be disposed throughout the concavo-concave structure in a random or uniform fashion in a variety of patterns. For uniform fluidization, it is preferred that the frusto-conical openings be disposed in some uniform pattern such as the concentric pattern shown in FIG. 2. The number of frusto-conical openings can vary widely consonant with the above requirements. From 1 to 5 openings per square foot (10 to 40 openings per square meter) are recommended for best performance, particularly when the concavo-concave structure is constructed of ceramic materials. The average thickness of the concavo-concave structure, or the average length of the frusto-conical openings can vary from 1 to 20 times the diameter of the outlet cavity. For best performance, the preferred average length of the frusto-conical openings is from 2 to 7 times the diameter of the outlet cavity.

The peripheral configuration of the foraminous member of the invention is not critical. It can be any shape which conforms to that of the reaction chamber in which it is used. It is essential that the periphery of the foraminous member closely fit the reaction chamber so no solids can bypass the frusto-conical openings in the member.

Referring now to FIG. 3, there is shown a multichamber fluidizing apparatus designed for fluidizing a recirculating cocurrent flow of gases and solid particles. The apparatus comprises a generally cylindrical reactor vessel 6 composed of a series of three superimposed reaction chambers 7, 8 and 9. The exterior reactor wall can be composed of a heat resistant material, for example, a foundry type of brick or a metal such as Inconel. It will be noted that in the embodiment of fluidizing apparatus depicted in FIG. 3 the wall defining lower reaction chambers 7 and 8 tapers to some extent at the base in order to insure uniform flow of solids and gas throughout the reaction. With large reactors, it is advantageous for the diameter to be somewhat smaller in the lower portion of the reactor, i.e., reaction chamber 7 where solid particles of material to be vaporized enter. Successive reaction chambers may have a somewhat greater diameter to allow for the increased volume of gas as the solid material vaporizes.

The fluidizing gas, such as oxygen, or a mixture of fluidizing gas and solid material to be reacted, such as ferric chloride is pneumatically conveyed under pressure of the fluidizing gas through conduit 10 directly to the base of reactor 6 and enters the lower reaction chamber 7 through a single port 11. Just above port 11, conduit 12 intersects the wall of reactor 6, i,e., at port 13. A flow of inert solid particles is introduced to reaction chamber 7 through conduit 12 through port 13 at the same time that the fluidizing gas or mixture of fluidizing gas and solid material to be vaporized enter through port 11.

Between reaction chambers 7 and 8 and between reaction chambers 8 and 9 are foraminous members 14 and 15 containing frusto-conical openings 16 and 17 described more fully in reference to FIGS. 1 and 2. The foraminous members may be composed of metallic or ceramic materials, e.g., Inconel or sintered alumina. The primary purpose of the foraminous 14 and 15 is to subdivide the vertical reaction area defined by reactor 6 into a series of successive communicating reaction chambers such that the distribution of particles will be essentially homogeneous throughout the reactor and will be in the nature of a fluidized mass suspension of particles.

The reacted fluidized mass of gases and solids is withdrawn from the uppermost reaction chamber 9 through single port 18 and transported through conduit 19, again pneumatically, to a cyclone 20, or other suitable device for effecting a separation of the gaseous and solid components of the reacted fluidized mass. The gaseous components in the reacted fluidized mass exit from the cyclone through line 21 to appropriate scrubbing storage, use or water disposal facilities. The solid components of the reacted fluidized mass are recycled to reactor 6 after passing successively through conduits 22 and 12. Needle valve 23 at the junction of conduits 22 and 12 is manually operated to regulate the flow of inert solids through the entire loop.

To operate the above described apparatus so that there is no distinct bed level, i.e., the entire reactor is filled or flooded, the flow of inert solids through the reactor must be at least equal to the flow of fluidizing gas through the reactor, on a weight basis. The foraminous members of the invention insure that the solids and gases remain in a state of homogeneous fluidization throughout each reaction chamber. Most advantageously, the flow of solid particles will be about 5 to about 20 times the flow of gas, again on a weight basis.

What is claimed is:
1. In a material fluidizing apparatus comprising at least two communicating reaction chambers, each reaction chamber being separated from the next adjacent one by a foraminous member, and means for maintaining a recirculating cocurrent flow of gases and solid particles through said reaction chambers, the improvement wherein said foraminous member is a concavo-concave structure having a plurality of frusto-conical openings extending therethrough to permit continuous passage of said flow of gases and solid particles from a first reaction chamber to a second adjacent reaction chamber and to produce a pressure drop across said foraminous member from 0.5 to 5.0 psi, said frusto-conical openings being disposed in said concavo-concave structure so as to provide a pattern of spaced substantially circular cavities on the inlet side and the outlet side of said concavo-concave structure, the diameter of said cavities on the inlet side of said concavo-concave structure being from 25 to 100 times greater than the average particle size of said solid particles, the diameter of said cavities on the outlet side of said concavo-concave structure being from 2 to 10 times greater than the diameter of said cavities on the inlet side of said concavo-concave structure, the average thickness of said concavo-concave structure being from 1 to 20 times the diameter of a cavity on the outlet side of said concavo-concave structure, and the percentage of the area of the outlet side of said concavo-concave structure defining said frusto-conical openings being at least 70% of the total area of said outlet side of said concavo-concave structure.

2. Material fluidizing apparatus according to claim 1 wherein said frusto-conical openings are disposed in said concavo-concave structure so as to define a uniform concentric pattern of cavities on the inlet side and the outlet side of said concavo-concave structure.

* * * * *